UNITED STATES PATENT OFFICE.

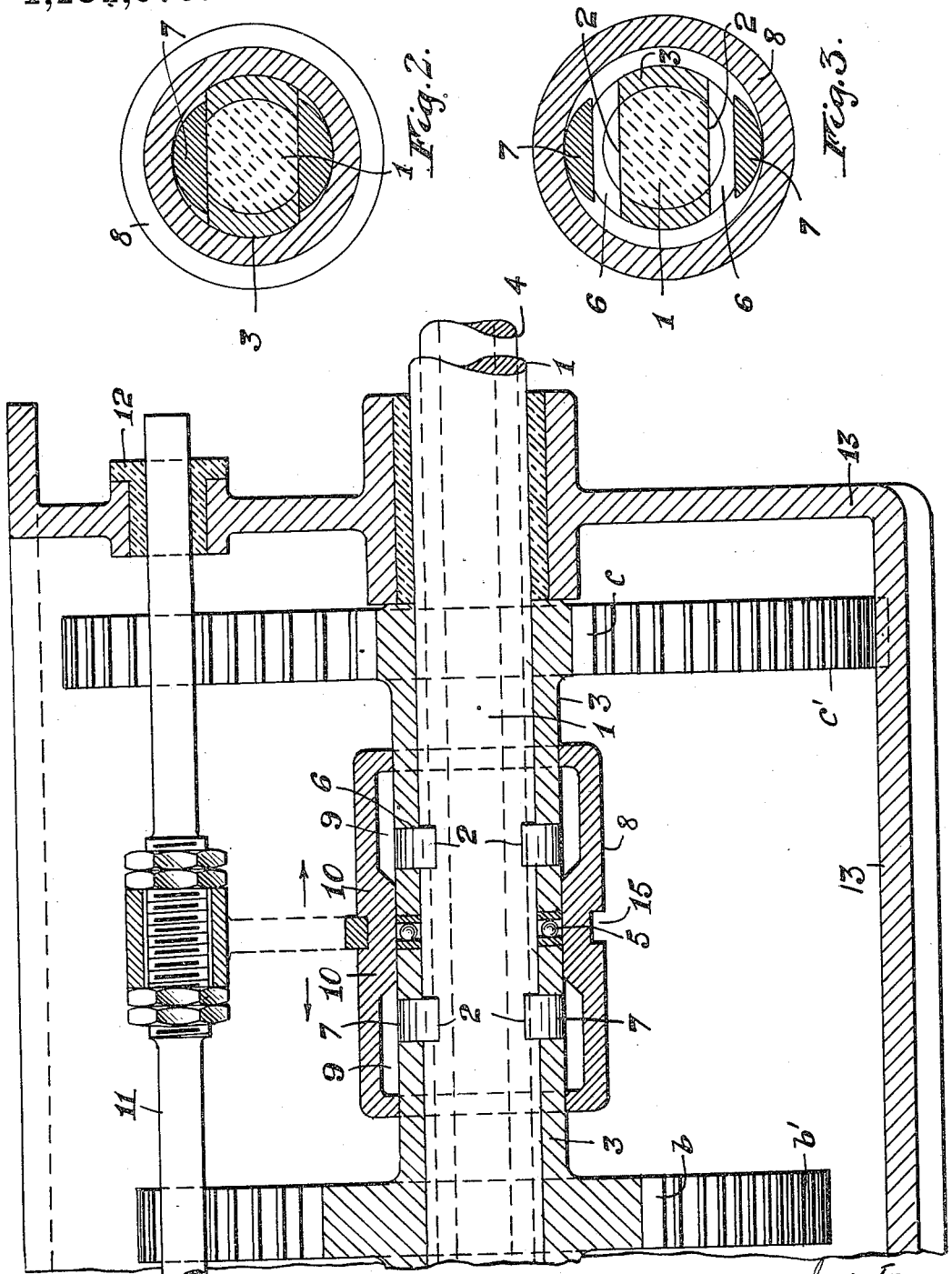

JOHN WILLIAM BARNES, OF ROCK FERRY, ENGLAND.

CLUTCH MECHANISM.

1,151,079. Specification of Letters Patent. Patented Aug. 24, 1915.

Application filed February 25, 1914. Serial No. 820,910.

*To all whom it may concern:*

Be it known that I, JOHN WILLIAM BARNES, a subject of the King of Great Britain, and a resident of Rock Ferry, Cheshire, England, have invented certain new and useful Improvements in Clutch Mechanisms Applicable for Variable-Speed Gearing, of which the following is a specification.

This invention relates to improvements in clutches whereby a continuously rotating shaft or element may be clutched alternatively to one or other of two or more rotary elements.

According to this invention the continuously rotating or driving element is provided with two or more sets of key-ways or transverse recesses forming tangential flats in the cylindrical surface thereof. These flats are arranged in pairs, the two flats of each pair being diametrally disposed. Radially movable keys or pads of segmental section engaging perforations in the driven elements are adapted to be moved into engagement with the continuously rotating element, or allowed to become freed therefrom, by the operation of an axially movable sleeve or sleeves.

The invention is illustrated in the accompanying drawings, which show its application to a change speed gearing, Figure 1. being a vertical section through a portion of a variable speed gearing box suitable for, say, a motor car drive. Fig. 2 illustrates a detail cross sectional view through the operating sleeve and clutch, the keys being shown engaged, and Fig. 3 a similar view but showing the pads in their disengaged position.

In applying the invention to a clutch mechanism for a change speed gear as shown in the drawings, the continuously rotating element or driving shaft 1 is provided with a series of pairs of transverse flats 2 cut in the shaft. Mounted upon tubular bosses 3 on the shaft 1 are the respective driving pinions $b$, $c$ for the different speeds to be obtained.

The opposing ends of the tubular bosses 3 are fitted with ball races 5 or the like, so as to take up any end thrust.

Perforations 6, corresponding axially in position with the flats 2 in the driving shaft, are formed in the tubular bosses of the driving pinions $b$, and $c$, and in these perforations are fitted radially movable segmental pads 7, flat on their inner sides which engage the transverse keyways 2, and circular on their outer faces.

Sleeve 8, is provided with two interior annular recesses 9 and each annulus having an oblique end cam face 10 fitted over the tubular bosses 3 so as to be capable of sliding axially thereon. Between the inner cam faces 10 of the sleeves 8, the bores of the sleeves are reduced to fit the outer diameter of the bosses 3. The section in Fig. 2. is taken through such reduced bore, Fig. 3. being a section through the annulus. By sliding the sleeve 8 axially to one side or the other the reduced bore may be brought over one or other pair of the segmental pads 7 controlling the bosses 3 of the driving pinions $b$ or $c$, the end cam faces forcing the pads 7 into engagement with the flats 2. If, for instance, the sleeve 8 be slid to the left the driving pinion $b$ will be keyed to the driving shaft 1. At the same time the pads 7 controlling the driving pinion $c$ will be permitted to disengage themselves from the transverse flats 2 by reason of the annular clearance 9 coinciding with those pads. The pads disengage themselves by an outward radial movement due to centrifugal action. Similarly by moving the sleeve 8 to the right, the driving pinion $c$ will be connected to the driving shaft and the pinion $b$ released.

The axial distance apart of the pads 7 and the length of the reduced bore of the sleeves is so arranged that the sleeve may be moved to a central neutral position, in which both sets of pads controlled by the sleeve will be free. With such an arrangement, either of the pinions $b$, or $c$, may be clutched in gear.

Any suitable mechanism may be provided for axially moving the sleeves. In the arrangement shown, the sleeve 8 is operated by means of a shaft 11, slidably mounted in bearings 12, in the casing 13, and adapted to be controlled from any suitable position, the shaft being provided with a forked branch 14 engaging an annular recess 15 in the sleeve 8.

As shown in Figs. 2. and 3., the outer circular faces of the pads are preferably made of greater curvature or shorter radius than the interior wall of the reduced bore of the sleeve, such a formation enabling the pads when engaged to tend to wedge themselves into the angular space left between the inner curvature of the sleeve bore, and the transverse flats cut in the shaft and the perforations in the tubular boss, thereby enabling the flat sides of the pads to more accurately bed against the flat transverse recesses cut in the driving shaft.

Although the driving element has been described as a shaft, and the tubular bosses as the driven element, it will be obvious that this arrangement may be reversed. With such a type of clutch the teeth of the gear wheels always being in mesh no detrimental effect thereon arises at the moment of operating the clutch to change the gears.

I claim:—

1. A clutch mechanism for variable speed gearing, comprising, a driving shaft provided with sets of transversely flatted recesses, driven elements on the shaft, perforations in the driven elements corresponding with the recesses in the shaft, and radially movable keys or pads of segmental section adapted to be moved into engagement with the recesses in the driving shaft or to be freed therefrom by the axial movement of a sleeve.

2. A clutch mechanism for variable speed gearing, comprising, a driving shaft provided with sets of transversely flatted recesses, driven elements on the shaft, perforations in the driven elements corresponding with the recesses in the shaft, and radially movable keys or pads of segmental section adapted to be moved into engagement with the recesses in the driving shaft or to be freed therefrom, and an axially movable sleeve controlling each pair of said keys.

3. A clutch mechanism for variable speed gearing, comprising, a driving shaft provided with sets of transversely flatted recesses, driven elements on the shaft, perforations in the driven elements corresponding with the recesses in the shaft, and radially movable keys or pads of segmental section adapted to be moved into engagement with the recesses in the driving shaft or to be freed therefrom by the axial movement of a sleeve, the curved surface of the pads being of shorter radius than the bore of the sleeve by which the pads are engaged.

In testimony whereof I affix my signature in presence of two witnesses.

JOHN WILLIAM BARNES.

Witnesses:
A. J. DAVIES,
R. S. JONES.

Copies of this patent may be obtained for five cents each, by addressing the "Commissioner of Patents, Washington, D. C."